UNITED STATES PATENT OFFICE.

LESTER KIRSCHBRAUN, OF EVANSTON, ILLINOIS.

PROCESS OF MAKING WATERPROOF COMPOSITION.

1,417,837.  Specification of Letters Patent.  Patented May 30, 1922.

No Drawing.  Application filed July 15, 1920. Serial No. 396,413.

*To all whom it may concern:*

Be it known that I, LESTER KIRSCHBRAUN, a citizen of the United States, residing in the city of Evanston, county of Cook, and State of Illinois, have invented certain new and useful Improvements in Processes of Making Waterproof Composition, of which the following is a specification.

This, an application, is a continuation in part of an original application filed September 4th, 1918 by me, Serial No. 252,604.

This invention relates to a process of making waterproof compositions and has among its salient objects to provide a process of making a waterproof product consisting essentially of an emulsifying agent, an adhesive binder and a fibre or filler; to provide a process the product of which may have a wide range as to flexibility, rigidity, weight and toughness and in which the fibrous portion thereof can be made from relatively cheap or waste material; to provide a process the product of which may be formed into sheets of any desired size or configuration, and in general to provide an improved process of the character referred to.

This invention produces a product in which the asphalt or other adhesive binder is oxidized while in a finely dispersed state or in other words in which the particles of asphalt are in discrete form while contained in an aqueous vehicle. This oxidized asphalt while in its aqueous vehicle forms a non-adhesive emulsion in which the water forms the external or continuous phase and the asphalt or other binder the internal or dispersed phase. The asphalt still remains in this non-adhesive emulsion after it has been mixed with fibre. Because of the very fine dispersion of the asphalt particles, a maximum surface of the asphalt is developed and is exposed to the oxidizing agent. Much more effective oxidation therefore takes place than where asphalt in a continuous body is oxidized. Moreover, oxidation can take place at lower temperatures. In fact the oxidation may be pronouncedly exothermic. It is also to be understood that the discrete particles of asphalt referred to are of such a size that all or substantially all of them will pass through a screen having forty thousand openings per square inch and vary in fineness to microscopic bodies approaching colloidal size. Numerous of these particles are of such fineness as to exhibit Brownian movement. It must be seen that on account of the extreme fineness of these particles the action of the oxidizing agent will be greatly facilitated.

In carrying out the process I preferably make an aqueous paste from water and material containing colloidal particles such as certain kinds of clay. Suitable other colloidal material than clay can be used if desired. To this aqueous paste is then added, preferably gradually, adding water from time to time if necessary, a liquid adhesive binder, such for example as natural or artificial asphalts, petroleum residuums, wax tailings, coal tars and other hydro-carbons. If the binder is solid at ordinary temperatures it must be liquefied by heat, and in such case the aqueous paste is preferably also kept hot. After this binder is added to the emulsifying agent, to-wit, the aqueous paste, an oxidizing agent is added to the hot mixture, which may be done either by adding sulphur or mineral dryers to the mixture or by blowing air through the same. Where sulphur or mineral dryers as an oxidizing agent are used, it may be desirable to add them first to the binder before the binder is mixed with the aqueous paste. The oxidizing of this mixture will convert a relatively low melting point binder into a high melting point binder, and thus result in a harder and tougher composition when dry. Where sulphur or mineral dryers as an oxidizing agent are used, the oxidation may in effect take place during the time when the material is being dried and the water removed or the material may be baked or subjected to continued heat treatment after the water is removed. This composition before it is sheeted or formed into other desired shape, may have mixed with it a suitable fibre or filler.

Another way in which a composition of the above general character can be formed will be to form an aqueous paste, as before stated, and then add a binder such as animal or vegetable pitches, drying oil, such as linseed oil and chinawood oil, and a binder of this character oxidized in either of the ways above referred to. As a matter of fact where the binder is linseed oil, the oxidation will take place in the air without the addition of a specific oxidizing agent, although the oxidizing agent will materially lessen the time necessary for oxidizing. To this emulsified matrix last described may also be added a suitable fibre or filler.

An emulsified matrix may also be formed as follows: To an aqueous paste may be added a binder consisting of rubber dissolved in suitable solvent and the rubber vulcanized by adding sulphur to the rubber, either before or after the rubber is added to the aqueous paste. The binder instead of consisting of rubber may be a mixture of natural rubber and so-called mineral rubber of commerce and other substitutes. To this may be added sulphur or the mineral dryer above referred to. The term oxidizing is used in this specification to include the well known action of sulphur upon hydrocarbon products which results in the removing of hydrogen therefrom with subsequent condensation.

I have described three different emulsified matrices. Inasmuch as each of these matrices may have different properties, due to the different characteristics of the binders, it may be desirable to mix all three of them together or any two of the three and to mix them in varying proportions relative to each other. This may be done in order to produce certain definite physical characteristics in a resultant product which are not contained in any one of the matrices alone.

These emulsified compositions with or without the fibres can be formed into suitable sheets or other shapes and the water dried out to form a waterproof composition, and the oxidizing may take place during the emulsifying or at a later step in the process. Where the binder consists of linseed oil or certain animal or vegetable pitches, such as stearine pitch, palm pitch, cottonseed pitch and candle pitch, the material not only is waterproof when dry and after oxidation, but is also grease-proof and not affected by oils and the like.

Another way in which the emulsified matrix may be formed containing a high melting point binder would be to carry on the emulsifying operation under pressure. This may be accomplished as follows: An aqueous paste would be put in an airtight receptacle to withstand pressure. This receptacle is provided with a mechanical stirrer or agitator which first stirs up the hot paste, a relatively high melting point binder is then added while under pressure and the emulsifying agent and the binder incorporated to form the matrix. The entire operation is carried on under pressure. This pressure may be obtained by the generation of part of the water into steam or by an extraneous gaseous pressure such as air or a non-oxidizing gas. From time to time water will probably have to be added to facilitate the forming of the emulsified matrix. After the emulsion is formed the contents of the pressure receptacle are cooled, the pressure released and the matrix can then be mixed with a suitable fibre or filler.

It is to be understood that in making any of the emulsified compositions above referred to that the emulsion should be of a non-adhesive character stated and that the asphalt should be oxidized while in discrete particles although further oxidation may take place after or during the removal of water. It is also to be understood that by the term "bituminous" I mean the various binders and oils referred to in the specification.

I claim as my invention:

1. A stock consisting of bitumen in a discrete form in an aqueous vehicle and containing an oxidizing agent.

2. Oxidized bitumen in a discrete form contained in an aqueous vehicle.

3. Oxidized bitumen in a discrete form contained in an aqueous vehicle, the discrete particles being of such size as will pass a mesh containing 40,000 openings to the square inch.

4. A process of making a bituminous composition consisting in oxidizing bitumen while the latter is contained in discrete form in an aqueous vehicle.

5. A process of making a bituminous composition consisting in oxidizing bitumen while the latter is contained in discrete form in a heated aqueous vehicle.

6. A process of oxidizing bitumen consisting in mixing bitumen, particles of which are in a discrete form in an aqueous vehicle with an oxidizing agent.

LESTER KIRSCHBRAUN.